Figure 1:
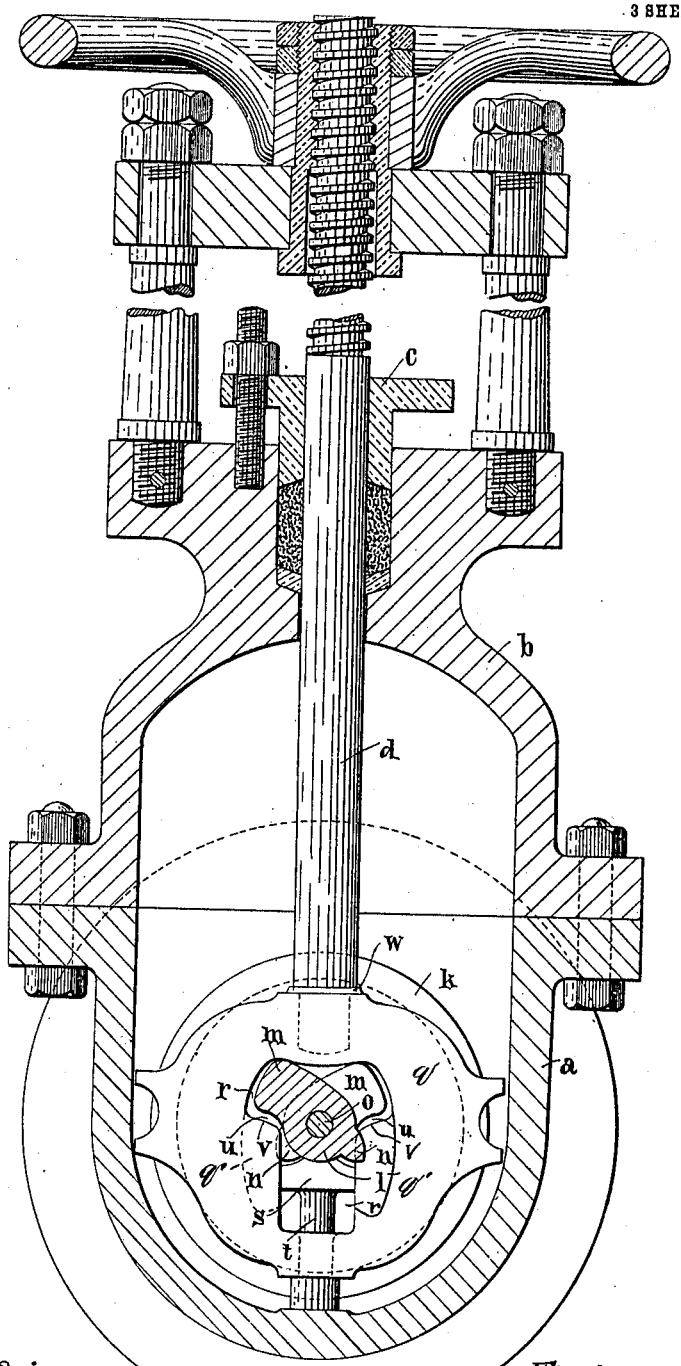

F. W. LEEVERS.
STOP AND THROUGH WAY VALVE.
APPLICATION FILED JAN. 6, 1909.

970,245.

Patented Sept. 13, 1910.

3 SHEETS—SHEET 1.

WITNESSES:
W. M. Avery
J. P. Davis

INVENTOR
Frederic William Leevers
BY
Munn & Co.
ATTORNEYS

F. W. LEEVERS.
STOP AND THROUGH WAY VALVE.
APPLICATION FILED JAN. 6, 1909.

970,245.

Patented Sept. 13, 1910.
3 SHEETS—SHEET 2.

INVENTOR
Frederic William Leevers

F. W. LEEVERS.
STOP AND THROUGH WAY VALVE.
APPLICATION FILED JAN. 6, 1909.
970,245.
Patented Sept. 13, 1910.
3 SHEETS—SHEET 3.
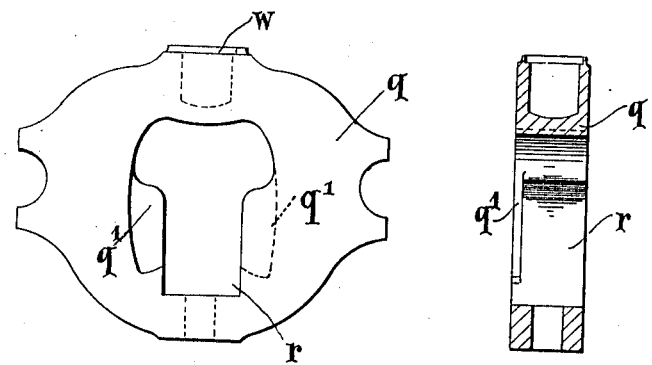
Fig. 4.   Fig. 5.
Fig. 6.
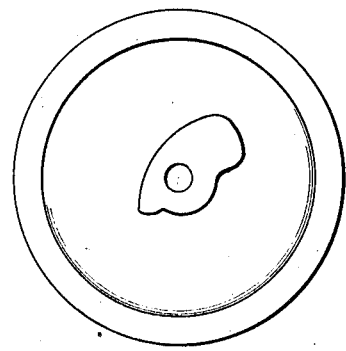
WITNESSES
C. E. Holske
J. P. Davis
INVENTOR
Frederic William Leevers
BY
Munn & Co.
ATTORNEYS

UNITED STATES PATENT OFFICE.

FREDERIC WILLIAM LEEVERS, OF WALTHAMSTOW, ENGLAND.

STOP AND THROUGH-WAY VALVE.

970,245.  Specification of Letters Patent. Patented Sept. 13, 1910.

Application filed January 6, 1909. Serial No. 470,956.

*To all whom it may concern:*

Be it known that I, FREDERIC WILLIAM LEEVERS, a subject of the King of Great Britain and Ireland, and residing at No. 37 Howard road, Walthamstow, in the county of Essex, England, have invented certain new and useful Improvements in Stop and Through-Way Valves, of which the following is a specification.

This invention relates to stop and through way valves for gas, steam, water and like purposes and of the type wherein two valve disks are adapted to be lowered opposite to their seats and then thrust thereupon so as to close off the through way passage. In this type of valve the valve spindle when screwed down usually thrusts the valve disks upon their seats through the medium of wedge blocks or like devices. It is found in practice with this type of valve that the valve disks begin to press upon their seats before they reach their central position, the pressure upon the seats increasing as they approach their central position so that considerable force is required to complete the closure of the valve due to the excessive friction thereby set up. The final stress imposed upon the valve spindle when closing the valve remains thereon during the whole time that the valve is closed and consequently when the valve spindle is subjected to variations in temperature as in a steam valve, this stress is further increased due to the expansion of the spindle and this results in straining the spindle and its nut and also in jamming the valve disks upon their seats. The friction between the valve disks and their seats when closing also results in undue wear of the valve disks and seats.

The object of the present invention is to avoid the above mentioned difficulties by arranging that the valve disks shall not be thrust upon their seats until they reach the central position and then that they shall be thrust upon their seats simultaneously with a rotational movement so that any wear of the seats resulting therefrom is not detrimental and less force is required to be applied to the spindle to effect a tight closure, than is the case with the wedge type of valve before referred to.

Another object is to enable the screwed spindle to be slackened off slightly after the valve disks have been thrust upon their seats and without relieving the thrust upon the latter, in order that the spindle and its nut may be relieved of undue stress due to variations in temperature.

The invention consists in adapting the valve disks in a stop and through way valve to be lowered to a central position relatively to the seats and then to be simultaneously rotated and thrust upon their seats.

The invention also consists in providing the valve disks with coöperating cam surfaces for effecting the closing of the disks upon their seats when they are rotated, and the invention further consists in providing these disks with lugs or levers adapted to be operated upon by the valve spindle with or without the coöperation of a thruster in order to effect the rotation of the disks.

Figure 2:
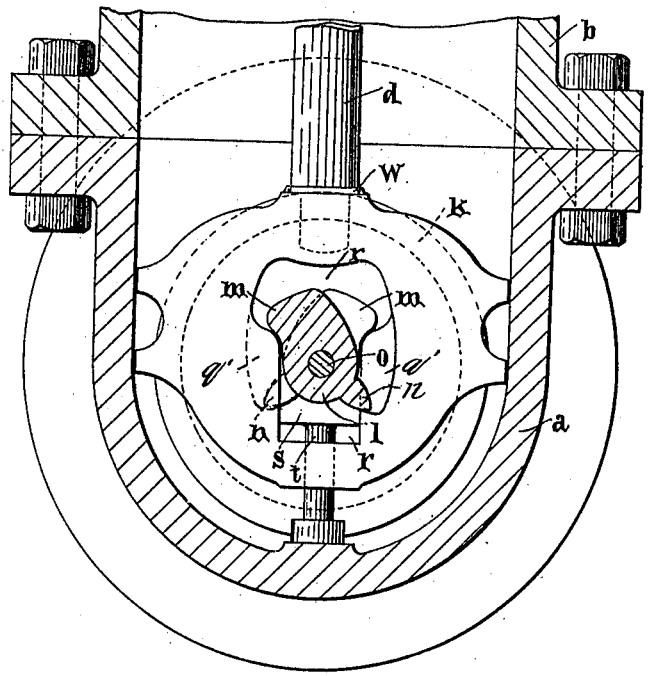
Figure 3:
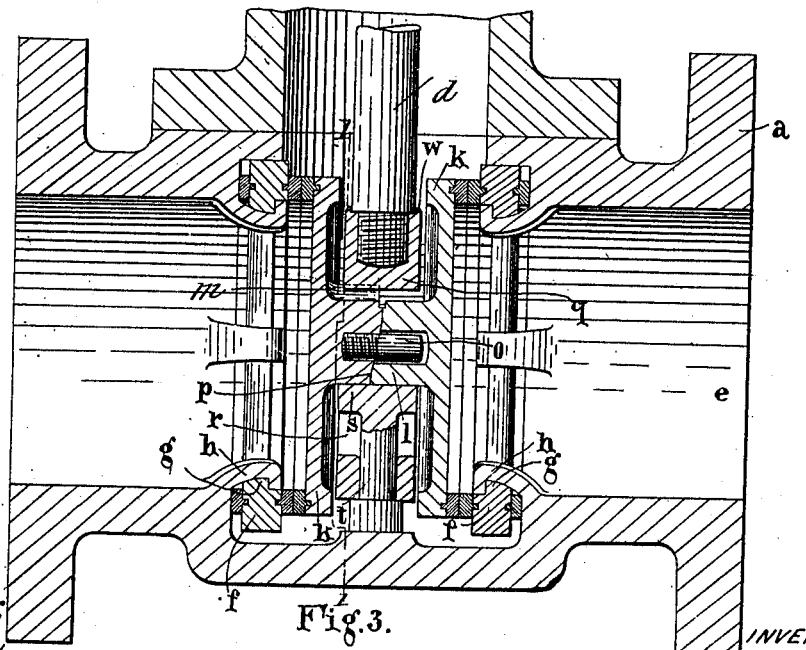

The accompanying drawings illustrate one form of stop and through way valve according to the invention, Figure 1 being a front sectional view and showing the valve disks in the position they assume when thrust upon their seats, Fig. 2 being a similar view of the lower part of the valve showing the valve disks being withdrawn. Fig. 3 is a side sectional view corresponding to Fig. 1, and Figs. 4 and 5 are details, Fig. 5 being a vertical transverse section of Fig. 4, and Fig. 6 is a side view of one of the valve disks from the inner side.

In carrying out the invention according to one mode as for instance, when constructing a valve for controlling steam, gas, water or the like and for manipulation by a spindle, hand wheel or lever fitted with a nut, the valve body, $a$, is made of the usual tee form with flanges at the end of each branch to suit the form of coupling or piping to which the valve is to be attached. On the upper portion of the valve body a bonnet, $b$, is mounted provided with the usual stuffing box, $c$, for the spindle, $d$, to work through.

Within the through way opening, $e$, of the valve body, $a$, rings or bushes, $f$, are provided of gun metal, nickel, alloy or other suitable material for use as working faces for the valve disks. The rings, $f$, may be renewable or permanent. If renewable they are held in place by projections, $g$, on the inside of each ring, $f$, and which are wedged under lugs, $h$, cast on the inside of the valve openings as is sometimes adopted in this type of valve. The valve disks, $k$, may also be provided with renewable or fixed rings $k'$ of the same metal or material as those in the valve body, and working against similar rings $k^2$ on the valve seat.

Each valve disk, *k*, is formed with a boss, *l*, projecting from its inner face, and formed integrally with the boss, are upper and lower lugs, *m*, *n*. These lugs are intended to act as levers as will be hereinafter explained. The boss, *l*, of one valve disk, *k*, is tapped to receive the threaded end of a pin, *o*, the plain end of which enters a plain hole in the boss of the other disk. The adjacent faces of the bosses are formed as cam surfaces, *p*, or are similarly shaped so that when the disks are rotated they mutually thrust each other upon their seats.

In order to effect the required rotation of the disks a plate, *q*, carried by the valve spindle, *d*, and suitably guided in the valve body, is formed with a central opening, *r*, to receive the bosses of the valve disks, *k*, in such a manner that when the plate, *q*, thrusts downwardly it engages the lugs or levers, *m*, on the bosses, *l*, and through the medium of the latter rotates the valve disks in opposite directions, by which they are thrust and bedded upon their seats. At the lower end of the central opening in the plate, *q*, a saddle shaped head of a thruster, *s*, is situated, the stem *t* of the same passing through a lower orifice in the plate, *q*, and abutting against the bottom of the valve body when it reaches the latter in the operation of closing. The head of the thruster, *s*, engages the bosses and also a lower pair of lugs, *n*, formed thereon and assists in the rotation of the disks. The thruster first acts upon the lower lugs, *n*, revolving the disks sufficiently to take up any slack between the disks and their seats. It then acts as an abutment upon which the bosses may rest when the upper lugs or levers, *m*, are being acted upon by the plate, *q*. The length of the thruster, *s*, is determined so as to act as a distance piece to maintain the disks centrally with the bore of the valve when being closed.

The head of the thruster as shown more especially in Fig. 1 is provided at each side of its center with an incline or bevel. When the plate *q* is moved downward, the lugs *n* engage the inclines or bevels, and are deflected toward the sides of the openings *r*, and into recesses *q'* at the sides of the opening, one recess being arranged at one side of the plate, and the other at the other side. When the plate *q* moves upwardly, the lugs are swung back out of the recesses by the engagement of the sides of the opening *r* with the lugs *m*. After the rounded portions of the bosses seat on the central portion of the head, the downward movement of the bosses and closing disk is checked, and the further movement of the plate operates the lugs *m*.

It will be noticed in Fig. 1 that sufficient clearance at *u* is left between the lugs or levers *m* and the edges of the central opening, *r*, in the plate, *q*, to allow the latter to move slightly in an upward direction after the valve disks have been firmly bedded upon their seats, this slight movement of the upper plate, *q*, occurring without any rotation of the disks which therefore remain tightly upon their seats. By this arrangement it is possible to slacken off the spindle slightly after the valve has been closed so that any subsequent expansion or contraction of the spindle due to variations in temperature does not impose undue stress upon the spindle, its nut, the packing gland, or the bolts securing the bonnet joint, thus also avoiding leakage of the aforesaid joint. This important advantage and the fact that the valve can be closed tightly without undue stress being thrown on the valve body and other parts renders the valve especially applicable for use with high pressure and superheated steam. Further owing to the avoidance of the objectionable dragging action of the valve disks across the seat faces which occurs with the usual type of valve when being opened and closed, scoring or grooving of the seats and valve faces, if any, instead of being across the seats and faces as is usual, tends to take the form of concentric marks owing to the rotation of the disks when bedding on their seats.

When it is desired to open the valve the spindle is moved upwardly until the lower edges, *v*, of the central opening, *r*, in the plate, engage the end surfaces of the lugs or levers, *m*, and thereby rotate the disks which are quickly withdrawn from their seats and are free to be drawn up into the bonnet without any friction upon the seats.

As the spindle is relieved of any undue stress, as hereinbefore described, and as less power is required to open and close the valve than is the case with the usual type of valve, the spindle may be made of less diameter if desired. The spindle may be operated by any usual type of hand wheel, lever or the like, but when the invention is applied to a valve having a rotating spindle the lower end thereof which engages with the block or plate, *q*, is loosely inserted in a recess thereon and secured by a keep-ring or the like so that it is free to rotate without rotating the block or plate, *q*.

In order to avoid leakage through the stuffing-box when the valve is open, the upper part, *w*, of the plate, *q*, is turned in the form of a ring and adapted to bed or seat against a corresponding surface in the top of the bonnet thereby forming as it were a valve which will close off the stuffing box from the interior of the valve.

Having now described my invention, what I claim as new and desire to secure by Letters Patent is:—

1. A stop or through way valve of the type referred to, comprising in combination, a spindle, valve disks carried thereon, means for moving the valve disks so that their axes are made to coincide with the axis of the through way, means for then thrusting the valve disks upon their seats, and means for then moving the valve spindle relatively to the disks without loosening them.

2. A stop or through way valve of the type referred to, comprising in combination, a spindle, valve disks carried thereon, means for moving the valve disks so that their axes are made to coincide with the axis of the through way, automatic means for then thrusting the valve disks upon their seats and means for then moving the valve spindle relatively to the disks without loosening them.

3. A stop or through way valve of the type referred to, comprising in combination, a spindle, valve disks carried thereby, co-operating cam surfaces on the backs of the valve disks, means for moving the valve disks till their axes coincide with the axis of the through way, automatic means for then imparting a rotational movement to the valve disks so that their cam surfaces co-act to thrust them upon their seats and means for relieving the valve spindle of strain after the valve disks are fast upon their seats.

4. A stop or through way valve of the type referred to, comprising in combination, a spindle, a block thereon, an elongated bearing in the block, valve disks carried by said bearing, co-acting cam surfaces on the backs of the disks, means for moving the spindle, block and disks together till the axes of the latter and through way are in line, and means whereby the block and spindle are then moved relatively to the valve disks so that the cam surfaces of the latter relatively co-act to thrust the disks on to their seats.

5. A stop or through way valve of the type referred to, comprising in combination, a spindle, a block thereon, an elongated bearing in the block, valve disks carried in the bearing, co-acting cam surfaces on the backs of the disks, means for moving the spindle, block and disks together till just before the axes of the latter and through way are in line, means for moving the valve disks apart till they are nearly in contact with their seats, and means whereby when the axes are in line the block and spindle are then moved relatively to the valve disks so that the cam surfaces of the latter relatively co-act to finally thrust the disks onto their seats.

6. A stop or through way valve of the type referred to, comprising in combination, a spindle, a block thereon, an elongated bearing in the block, valve disks carried in the bearing, co-acting cam surfaces on the backs of the disks, means for moving the spindle, block and disks together till just before the axes of the latter and through way are in line, means for moving the valve disks apart till they are nearly in contact with their seats, means whereby when the axes are in line the block and spindle are then moved relatively to the valve disks to finally thrust the disks upon their seats and means for temporarily disconnecting the disks from the block and spindle.

7. A stop or through way valve of the type referred to, comprising in combination, a spindle, a bearing block thereon, a pair of valve disks, a boss on the back of each disk, a lever on each boss, means for moving the valve disks so that their axes are in line with that of the through way, and means whereby the block is caused to act on the levers to partly rotate the valve disks and simultaneously thrust them onto their seats.

8. A stop or through way valve of the type referred to, comprising in combination, a spindle, a bearing block thereon, a pair of valve disks, a boss on each, two levers on each boss, means for moving the valve disks so that their axes are brought into line with that of the through way, means for causing the block to act upon one lever of each boss during said movement to move the disks apart till nearly in contact with their seats, and means for causing the block to act upon the other lever at the end of the movement to finally thrust the disks upon their seats.

9. A stop or through way valve of the type referred to, comprising in combination, a spindle, a block thereon, an elongated bearing in the block, valve disks carried by the bearing, co-acting cam surfaces on the backs of the disks, means for moving the spindle, blocks and disks together, means for stopping the movement of the disks when their axes are in line with that of the through way and means whereby the block and spindle continue to move relatively to the valve disks in order that the latter may receive a part rotation to thrust them upon their seats.

10. A stop or through way valve of the type referred to, comprising in combination, a spindle, a block thereon, a bearing slot in the block, valve disks carried by the bearing, co-acting cam surfaces on the backs of the disks, a movable thruster depending from the block and engaging the slot therein means for moving the spindle block and disks together till the thruster engages the casing and thereby stops the valve disks, the block and spindle continuing to move to thrust the disks upon their seats.

11. A stop or through way valve of the type referred to, comprising in combination, a spindle, a block thereon, a bearing slot in the block, valve disks carried by the bearing, co-acting cam surfaces on the backs of the disks, a movable thruster depending from the block and engaging the slot therein, means for moving the spindle block and disks together till the thruster engages the casing and thereby stops the valve disks the block and spindle continuing to move to thrust the disks upon their seats, and means for temporarily disconnecting the spindle and block.

12. A stop or through way valve of the type referred to, comprising in combination, a spindle, a block thereon, a bearing slot in the block, valve disks on each side of the block, bosses on the backs of the disks resting in the slot, upper and lower levers on the bosses, co-acting cam surfaces on the adjacent faces of the bosses, a movable thruster depending from the block, a saddle head thereto engaging the slot, means for moving the spindle, block, disks and thruster, till the latter strikes against the valve casing, whereby the disks are moved apart till they nearly touch their seats and then are afterward finally pressed upon their seats when the disks are central with the through way, and means for temporarily disconnecting the spindle and block.

In testimony whereof I have signed my name to this specification in the presence of two subscribing witnesses.

FREDERIC WILLIAM LEEVERS.

Witnesses:
A. W. MATHYS,
H. E. DOD.